United States Patent
Guo et al.

(10) Patent No.: US 6,835,355 B2
(45) Date of Patent: Dec. 28, 2004

(54) JETTING FLUIDIZED-BED WITH A PARTITIONED DISTRIBUTOR AND DOUBLE HORIZONTAL NOZZLES

(75) Inventors: Qingjie Guo, Beijing (CN); Guangxi Yue, Beijing (CN)

(73) Assignee: Tsinghua University, Bejing (CN)

( * ) Notice: Subject to any disclaimer, the term of this patent is extended or adjusted under 35 U.S.C. 154(b) by 762 days.

(21) Appl. No.: 09/769,174

(22) Filed: Jan. 25, 2001

(65) Prior Publication Data
US 2002/0028161 A1 Mar. 7, 2002

(30) Foreign Application Priority Data
Jun. 2, 2000 (CN) .......................................... 00109017 A

(51) Int. Cl.[7] ................................................. B01J 8/20
(52) U.S. Cl. ...................... 422/139; 422/143; 422/147
(58) Field of Search ............................... 422/139, 143, 422/145, 147, 311

(56) References Cited

U.S. PATENT DOCUMENTS

| 3,661,558 A | * | 5/1972 | Heath et al. | ................ 423/110 |
| 4,702,891 A | * | 10/1987 | Li et al. | ..................... 422/140 |
| 5,372,791 A | * | 12/1994 | Abdulally | .................... 422/139 |
| 5,417,931 A | * | 5/1995 | Cetinkaya | .................... 422/139 |
| 6,200,534 B1 | * | 3/2001 | Ruottu | ........................ 422/145 |

* cited by examiner

Primary Examiner—Kiley S. Stoner
Assistant Examiner—Len Tran
(74) Attorney, Agent, or Firm—Milde & Hoffberg, LLP

(57) ABSTRACT

The present invention relates to a partitioned jetting fluidized bed with double nozzles, especially to a jetting fluidized-bed reactor with gas distributor, where a inclined nozzle is fixed at the side wall of the jetting fluidized bed above the gas distributor, and the gas pre-distribution chamber with gas distributor consists of a gas pre-distribution chamber with combined gas distributor and a gas pre-distribution chamber with perforated distributor. The two gas pre-distribution chambers are separated by a partition plate. The present invention can not only avoid the local agglomeration of the particles and the operation termination accident, but also broadens the adjustable range of the jet gas velocity and the distributor fluidization velocity. The excellent particle circulation can be reached in this jetting fluidized bed.

3 Claims, 1 Drawing Sheet

JETTING FLUIDIZED-BED WITH A PARTITIONED DISTRIBUTOR AND DOUBLE HORIZONTAL NOZZLES

BACKGROUND OF THE INVENTION

The present invention relates to a gas-solid fluidized-bed reactor, especially to a jetting fluidized bed reactor.

A jetting fluidized bed reactor in the prior art generally comprises a single horizontal nozzle, through which the reaction gas enters into the fluidized-bed reactor. Because of the existence of the horizontal jet, three regions are formed in the horizontal jetting fluidized bed: a jetting region, a bubbling region, and a dense-phase particle compression region. The region above the horizontal nozzle within the jetting depth is defined as a jetting region, which is a gas-solid reaction area; the region above the horizontal nozzle due to the jet being collapsed into bubbles (further than the jetting depth) is defined as a bubbling region; and the region below the horizontal nozzle is a dense phase particle compression region. Due to the suction effect of the jet, the particle density in the dense phase compression particle region is far greater than that in the emulsion-phase region. Since the particles are in a state of rest in the dense phase compression particle region, the reaction heat can not be transferred promptly, and the particles are prone to sinter in this region. With the local sintering range further expanded, the non-fluidized region in the bed would enlarge rapidly, which could lead to the reactor difficult to operate or even operation termination. Jet flow phenomenon occurs in many orifices in a distributor, bubbles generate after the jet is collapsed, small bubbles coalesce into large bobbles at a certain height above the distributor. The large bubbles will disturb the main jet to cause the main jet fluctuate strongly and the solid particles can not circulate well in the bed.

SUMMARY OF THE INVENTION

On account of the disadvantages in the art, an object of the present invention is to provide a fluidized-bed with partitioned distributor and double nozzles, which can not only avoid the local agglomeration of the particles and the operation termination accident effectively, but also broaden the operation range of the jet velocity and the pre-distribution fluidization velocity. Therefore, the non-fluidized phenomenon is eliminated effectively and a favorable circulation of the solid particles forms in the bed.

The object and task of present invention is achieved by the following technical concept. A fluidized-bed is composed of a jetting bed, a horizontal nozzle located at a side wall of the jetting fluidized bed, a gas distributor, a plenum chamber, and a cyclone, wherein an inclined nozzle is fixed at the side wall of the jetting bed above the gas distributor. The partition gas distributor consists of a combined gas distributor and a perforated gas distributor. The gas pre-distribution chamber is separated by a partition plate whose position can be adjusted according to industrial design requirements.

To avoid the coalescence of the bubbles (after the jet is collapsed) and the fluctuation of the main jet, a combined gas distributor includes three layers: one is a perforated distributor, and the other two are an anticorrosion fiber cloth and a stainless steel mesh, respectively. For a full understanding of the present invention, reference should now be made to the following detailed description of the preferred embodiment of the invention as illustrated in the accompanying drawing.

DESCRIPTION OF THE PREFERRED EMBODIMENT

Figure 1:
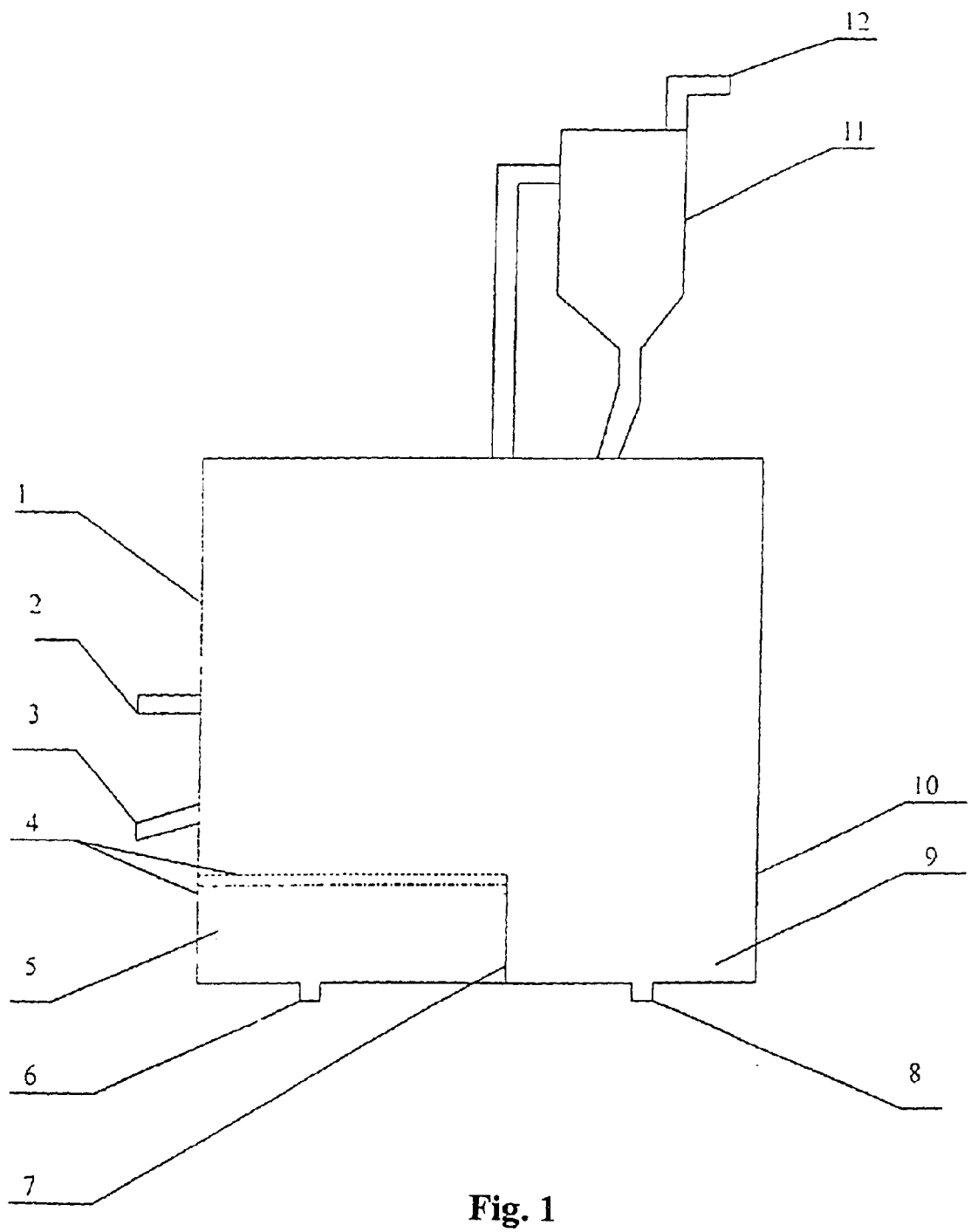
FIG. 1 is a schematic view of the structure of the invention.

The preferred embodiment of the present invention will now be described with reference to FIG. 1 of the drawings.

Now the principle, structure and the best embodiment of the invention will be explained in conjunction with the drawing.

As shown in the FIG. 1, the present invention mainly comprises a jetting fluidized-bed 1, a horizontal jetpipe 2, an inclined nozzle 3, a gas pre-distribution chamber with a combined gas distributor, 5, a partition plate 7, a gas pre-distribution chamber with a perforated distributor, 9, and a cyclone, 11. The inclined nozzle 3 is inclined upwardly, and its inclination angle, diameter, length within the jetting fluidized bed and jet velocity should be adjusted and controlled according to the condition of the main nozzle and its main jet gas volume. The inclined jet flow do not disturb the main jet flow and will be absorbed into the main jet flow after entering into the main jetting region, it. Since the inclination jet region includes the dense-phase particle compression region, the inclined jet flow could make the dense-phase particle compression region disappear. Therefore, the local agglomeration phenomenon of the particles in the jetting bed can be avoided, and the serious operation termination accident can be prevented.

The diameters of the horizontal nozzle and the inclined nozzle as mentioned above are unequal. The length of the two nozzles within the jetting bed and the inclination angle of the inclined nozzle should be determined according to the operation requirements. In detail, the ratio of the horizontal nozzle diameter to the inclined nozzle diameter is in the range of $1/5 \sim 1/3$. The upward inclination angle of the inclined nozzle (with relation to the vertical wall) is in the range of $25° \sim 55°$.

As jets occur in orifices of the gas distributor and the flow will coalesce into large bubbles at a certain height above the distributor, the main jet flow (horizontal jet) fluctuates strongly. Therefore, the gas pre-distribution chamber with gas distributor is partitioned into two gas chambers,—i.e. a gas pre-distribution chamber with a combined gas distributor 5 and a gas pre-distribution chamber with a perforated gas distributor 9—which are separated by a partition plate 7. Said two gas pre-distribution chambers are provided with a gas inlet 6 and a gas inlet 8, respectively. To avoid large bubbles formed at the distributor to disturb the horizontal jet, a combined gas distributor 4 consisting of three layers is employed in the bed: one is a perforated distributor, and the other two are an anticorrosion fiber cloth and a stainless steel mesh respectively. The perforated gas distributor, which is positioned in the bubble generation region with horizontal jet flow, utilizes a perforated gas distributor 10. The gas volume in the two corresponding pre-distribution chambers can be adjusted independently and effectively to ensure solid particles circulating well in the jetting fluidized bed. A cyclone 11 is positioned above the bed. The resultant gas enters into the post-processor through a gas outlet 12.

The following advantageous improvement can be obtained from present invention in comparison with the prior art: the inclined nozzle can eliminate the dense-phase particle compression region and avoid the local agglomeration of the particles and the operation termination accident. Furthermore, since the adjustable range of the jet gas velocity and the pre-distribution fluidization velocity is broadened due to the partitioned gas distributor, the solid particles can circulate well in the bed.

There has thus been shown and described a novel partitioned, jetting fluidized-bed which fulfills all the objects and advantages sought theref or. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. A partitioned, jetting fluidized-bed with double nozzles comprising a jetting bed body, a horizontal nozzle fixed in a side wall of the bed, a gas distributor, a gas pre-distribution chamber with gas distributor, and a cyclone, the improvement wherein an inclined nozzle is located at the side wall of the jetting bed body above the gas distributor, wherein the gas pre-distribution chamber with gas distributor includes a gas pre-distribution chamber with a combined gas distributor and a gas pre-distribution chamber with a perforated gas distributor, these two gas pre-distribution chambers being separated by partition plate.

2. A partitioned, jetting fluidized-bed with double nozzles according to claim 1, wherein the combined gas distributor of the gas pre-distribution chamber comprises three layers, one being a perforated distribution board, and the other two being an anticorrosion fiber cloth and a stainless steel mesh, respectively.

3. A partitioned, jetting fluidized-bed with double nozzles according to claim 1, wherein the ratio of the horizontal nozzle diameter to the inclined nozzle diameter ranges from $1/5$ to $1/3$, and the upward inclination angle of the inclined nozzle with respect to the vertical wall is in the range of 25°–55°.

* * * * *